US012764113B2

(12) United States Patent
Kuboyama

(10) Patent No.: US 12,764,113 B2
(45) Date of Patent: Oct. 13, 2026

(54) FEDERATED AUTHENTICATION SERVER, FEDERATED AUTHENTICATION METHOD, FEDERATED AUTHENTICATION SYSTEM, AND STORAGE MEDIUM

(71) Applicant: CANON KABUSHIKI KAISHA, Tokyo (JP)

(72) Inventor: Hideo Kuboyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 849 days.

(21) Appl. No.: 17/579,116

(22) Filed: Jan. 19, 2022

(65) Prior Publication Data

US 2022/0247745 A1 Aug. 4, 2022

(30) Foreign Application Priority Data

Jan. 29, 2021 (JP) ................................ 2021-013917

(51) Int. Cl.

| | |
|---|---|
| ***H04L 9/40*** | (2022.01) |
| ***H04L 9/32*** | (2006.01) |

(52) U.S. Cl.

CPC ........ *H04L 63/0884* (2013.01); *H04L 9/3213* (2013.01); *H04L 63/102* (2013.01)

(58) Field of Classification Search

CPC . H04L 63/0884; H04L 9/3213; H04L 63/102; H04L 63/0815

See application file for complete search history.

(56) References Cited

U.S. PATENT DOCUMENTS

| | | | | |
|---|---|---|---|---|
| 10,095,860 | B1 * | 10/2018 | McClintock ............ | G06F 21/45 |
| 2010/0125895 | A1 * | 5/2010 | Shull ....................... | H04L 63/08 726/4 |

(Continued)

FOREIGN PATENT DOCUMENTS

| | | | |
|---|---|---|---|
| JP | 2017154492 | A | 9/2017 |

OTHER PUBLICATIONS

Dodanduwa, Kavindu, and Ishara Kaluthanthri. "Role of trust in OAuth 2.0 and OpenID connect." 2018 IEEE International Conference on Information and Automation for Sustainability (ICIAfS). IEEE, 2018. (Year: 2018).*

(Continued)

*Primary Examiner* — Jung W Kim
*Assistant Examiner* — Sameera Wickramasuriya
(74) *Attorney, Agent, or Firm* — Canon U.S.A., Inc. IP Division

(57) ABSTRACT

A federated authentication server provides, in cooperation with an authentication server, a function of authenticating a user terminal to a resource server configured to provide a service to the user terminal, and includes an authentication information transmission unit configured to transmit authentication information about a user of the user terminal to the authentication server, a token reception unit configured to receive, from the authentication server, a token for use in accessing the resource server from the user terminal, a code issue unit configured to issue a code for identifying an authentication success response and transmit the code to the resource server, a storage unit configured to store the code and the token in association with each other, and a token transmission unit configured to transmit the token associated with the code to the resource server in a case where the code is transmitted from the resource server.

9 Claims, 6 Drawing Sheets

(56) References Cited

U.S. PATENT DOCUMENTS

| | | | | |
|---|---|---|---|---|
| 2011/0239283 | A1* | 9/2011 | Chern | H04L 9/3213 726/6 |
| 2014/0237580 | A1* | 8/2014 | Kato | H04L 63/08 726/9 |
| 2015/0312257 | A1* | 10/2015 | Antipa | H04L 63/10 709/225 |
| 2016/0226855 | A1* | 8/2016 | Takeo | H04N 1/00222 |
| 2016/0255243 | A1* | 9/2016 | Omori | H04N 1/4426 358/1.14 |
| 2017/0171201 | A1* | 6/2017 | Matsugashita | H04L 63/20 |
| 2017/0250970 | A1* | 8/2017 | Hoshino | H04L 63/08 |
| 2018/0007059 | A1* | 1/2018 | Innes | G06F 21/6218 |
| 2018/0025148 | A1* | 1/2018 | Jain | G06F 21/35 713/166 |
| 2019/0281037 | A1* | 9/2019 | Hoshino | H04L 63/102 |
| 2021/0234706 | A1* | 7/2021 | Nair | H04L 9/0825 |

OTHER PUBLICATIONS

Sadqi, Yassine, Yousra Belfaik, and Said Safi. "Web oauth-based sso systems security." Proceedings of the 3rd International Conference on Networking, Information Systems & Security. 2020. (Year: 2020).*

* cited by examiner

FIG.4

| CLAIM | VALUE |
|---|---|
| iss | https://id.xxx.com |
| sub | 007d4aaa-325f-4e4c-b689-62af2855e571 |
| aud | 5anqc1ps6b1odajfa12 |
| iat | 1607304779 |
| exp | 1607391179 |
| auth_time | 1607304779 |
| preferred_username | TestUser001 |
| email | TestUser001@yyy.com |

FIG.5

| CODE (501) | ID TOKEN (502) | REFRESH TOKEN (503) | CLIENT ID (504) | REDIRECT URI (505) | CODE EXPIRATION DATE (506) |
|---|---|---|---|---|---|
| aaeeaf51-d44e-4959-bc47-d3b6a37fdf31 | eyJraWQi....aa.... | 9c1bfabe-d3bf-4ae0-83b4-bd22f755dc61 | 5anqc1ps6b1odajfa12 | https://auth.service1.com/callback | 1607304879 |
| d80ffb2d-9f0d-4b8e-b9f0-42d5aa0fdd3f | eyJraWQi....bx... | 3a662474-7b8a-42b0-8b23-d38f9ae727fa | 5anqc1ps6b1odajfa12 | https://auth.service1.com/callback | 1607304891 |
| 8d35e4fd-ebb1-4d43-8207-dccdb3cb1412 | eyJraWQi....z1... | bb8d5c48-0332-40d3-a707-1b1005ab1bdc | 25knqc1ps6b1odajhm | https://service2.com/auth/rp | 1607305014 |

FEDERATED AUTHENTICATION SERVER, FEDERATED AUTHENTICATION METHOD, FEDERATED AUTHENTICATION SYSTEM, AND STORAGE MEDIUM

BACKGROUND

Field

The present disclosure relates to a federated authentication server configured to provide, in cooperation with an authentication server, a function of authenticating a user terminal, a federated authentication method, a federated authentication system, and a storage medium.

Description of the Related Art

A service that enables a user at a user terminal to use various functions provided by a server apparatus via a network has been widely developed in recent years. In many cases, the server apparatus (hereinafter referred to as the "resource server") providing the service requests user authentication using account information such as a user identification (ID) and a password, when receiving from the user terminal a request for accessing a resource stored on the resource server.

In order to perform the user authentication, the resource server needs to prepare a server (hereinafter referred to as an "authentication server") for user authentication in addition to the service that the resource server provides. A service, such as OpenID Connect (OIDC), for federated authentication using a user ID issued by an identification (ID) provider of a cloud service as the user ID of the user has been discussed and known. Using such an authentication service, the resource server no longer needs to prepare its own authentication service, so that the resource server can focus on developing the service that the resource server provides.

According to a technique discussed in Japanese Patent Application Laid-Open No. 2017-154492, authentication information is transmitted to an external authentication system, and in a case where authentication is successful, the authentication information is stored in association with address information. Then, in a case where a response to a use end request transmitted based on an operation of ending the use of an external service on a predetermined screen is received, first authentication information associated with the address information of the external service is erased.

In a case where a federated authentication function such as OpenID Connect provided by the authentication service to be used and a function of a login screen for authentication satisfy requirements of the resource server, the resource server can use the authentication server using the technique discussed in Japanese Patent Application Laid-Open No. 2017-154492. However, the federated authentication function of the authentication service may be inadequate depending on the requirements of the resource server.

SUMMARY

Various embodiments of the present disclosure provide techniques and mechanisms for a function of authenticating a user terminal, in cooperation with an authentication server.

According to one embodiment of the present disclosure, a federated authentication server is configured to provide, in cooperation with an authentication server, a function of authenticating a user terminal to a resource server configured to provide a service to the user terminal. The federated authentication server includes an authentication information transmission unit configured to transmit authentication information about a user of the user terminal to the authentication server; a token reception unit configured to receive, from the authentication server, a token for use in accessing the resource server from the user terminal; a code issue unit configured to issue a code for identifying an authentication success response and transmit the code to the resource server; a storage unit configured to store the code and the token in association with each other; and a token transmission unit configured to transmit the token associated with the code to the resource server in a case where the code is transmitted from the resource server.

Further features of the present disclosure will become apparent from the following description of example embodiments with reference to the attached drawings.

BRIEF DESCRIPTION OF THE DRAWINGS

FIG. 4 is a diagram illustrating claims contained in an identification (ID) token according to the first example embodiment.

FIG. 5 is a diagram illustrating an example of data stored in a storage unit according to the first example embodiment.

DESCRIPTION OF THE EMBODIMENTS

Figure 1:
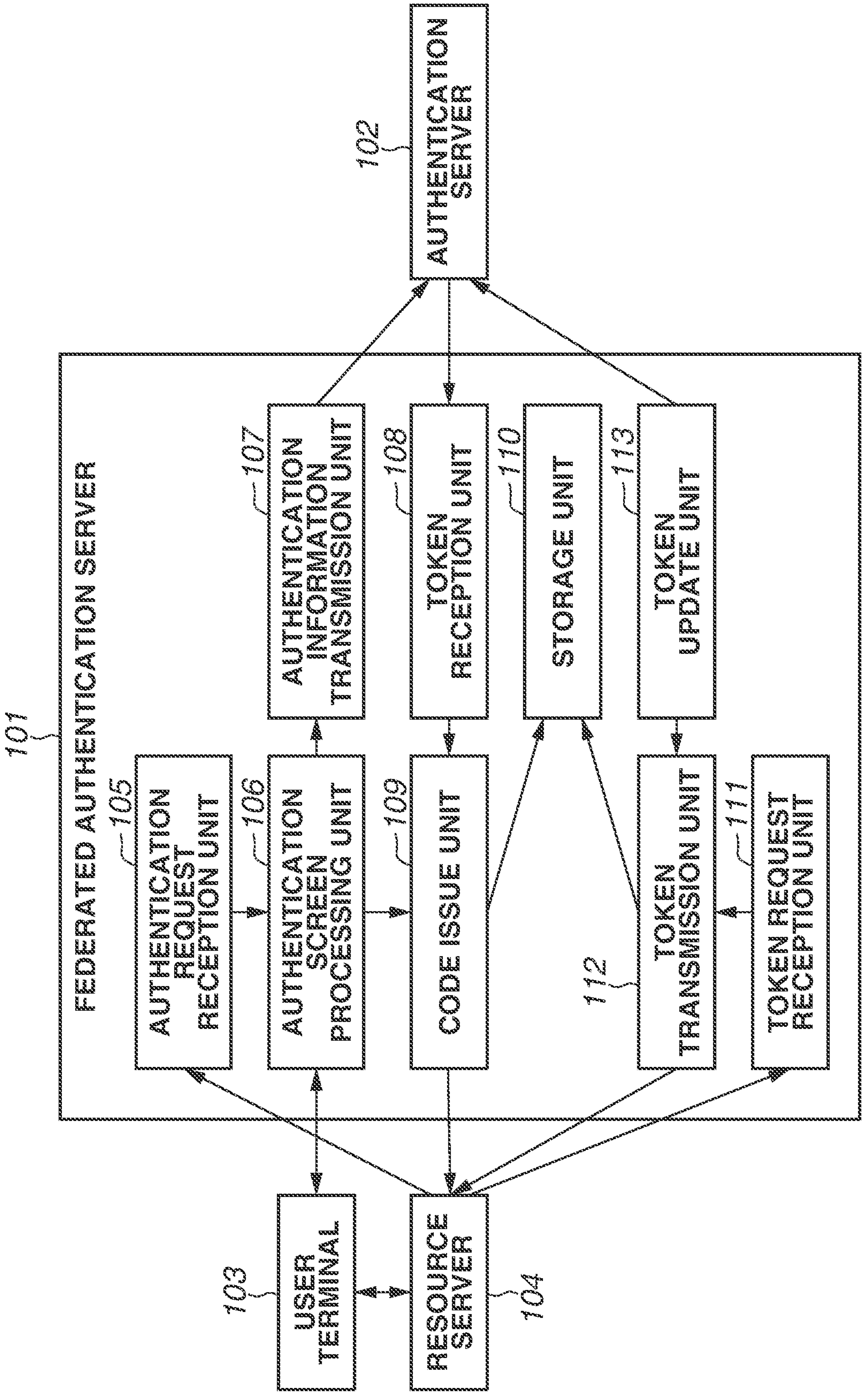
FIG. 1 is a diagram illustrating a functional configuration according to a first example embodiment.

FIG. 1 is a diagram illustrating a functional configuration of a federated authentication server 101 according to a first example embodiment of the present disclosure. In FIG. 1, an authentication server 102 manages identifications (IDs) and performs authentication processing and token issue processing. The federated authentication server 101 and the authentication server 102 cooperate with each other to function as a federated authentication system. A user terminal 103 is used by a user. A resource server 104 provides a service to be used by the user via the user terminal 103. The resource server 104 uses a token to manage access from the user terminal 103.

An authentication request reception unit 105 receives an authentication request transmitted from the resource server 104 to the federated authentication server 101. An authentication screen processing unit 106 enables the federated authentication server 101 to provide an authentication screen to the user terminal 103, and processes user authentication information input via the authentication screen. An authentication information transmission unit 107 transmits the user authentication information transmitted from the authentication screen processing unit 106 to the authentication server 102.

A token reception unit 108 receives a token from the authentication server 102 in a case where authentication is successful. A code issue unit 109 issues a code and transmits the code to the resource server 104. A storage unit 110 stores the code and the token in association with each other. A token request reception unit 111 receives a token request. A token transmission unit 112 transmits the token as a response to the token request. A token update unit 113 updates the token.

Figure 2:
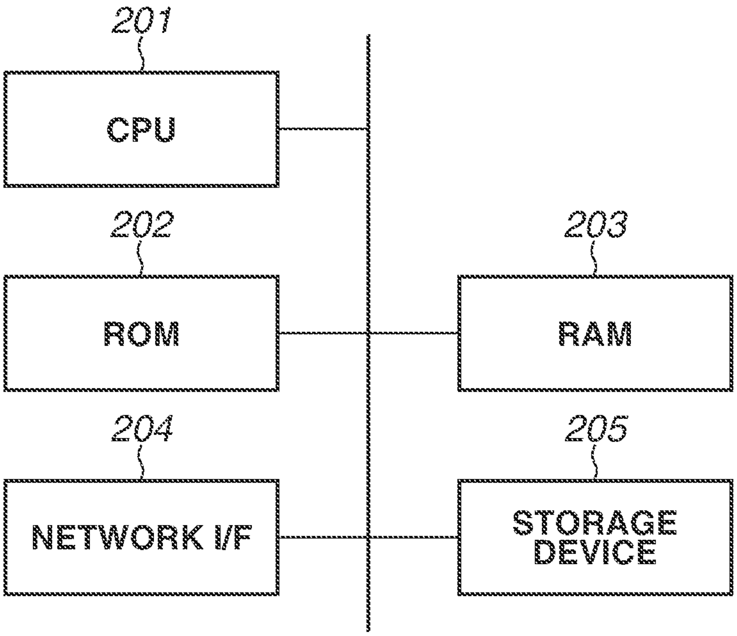
FIG. 2 is a diagram illustrating a hardware configuration according to the first example embodiment.

FIG. 2 is a diagram illustrating a hardware configuration of the federated authentication server 101 according to the present example embodiment. In FIG. 2, a central processing unit (CPU) 201 executes a control program for the federated authentication server 101. A read-only memory (ROM) 202 stores the control program. A random access memory (RAM) 203 is used to provide a work area of the CPU 201. A network interface (I/F) 204 communicates with applications outside the federated authentication server 101. A storage device 205 is, for example, a hard disk drive and stores data.

Figure 3:
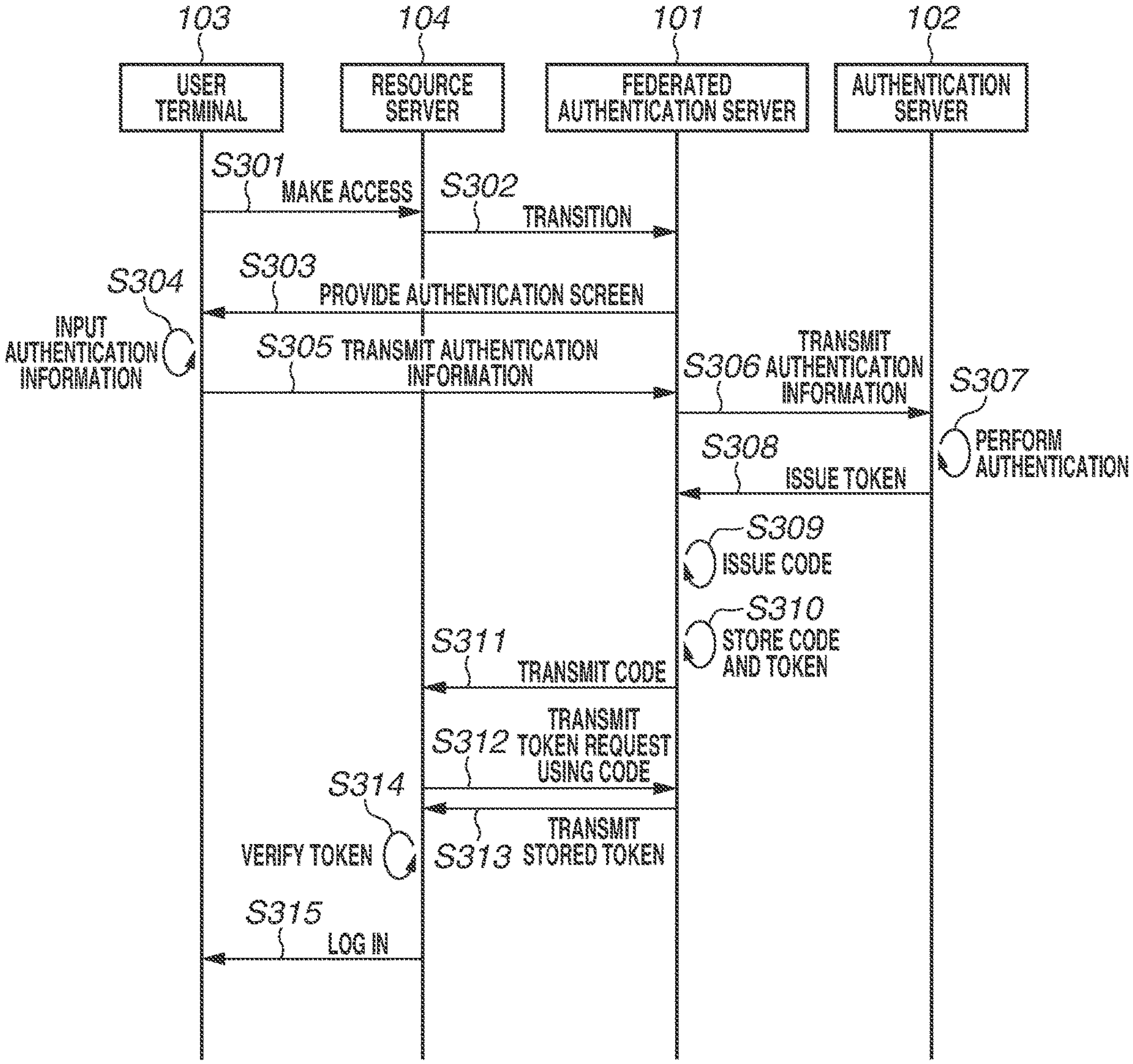
FIG. 3 is a diagram illustrating a sequence of a federated authentication server according to the first example embodiment.

FIG. 3 is a diagram illustrating a federated authentication sequence performed by the federated authentication server 101 according to the present example embodiment in response to receiving a request from the resource server 104.

First, in step S301, the user accesses the resource server 104 from the user terminal 103. For example, a predetermined universal resource locator (URL) is input from a browser of the user terminal 103 to access the resource server 104. At this time, the resource server 104 checks a login state of the user as the resource server 104. The login state is determined based on whether, for example, cookie information about the browser that corresponds to a domain of the resource server 104 contains a valid token. In a case where the resource server 104 is determined to be not in the login state, then in step S302, a transition to the federated authentication server 101 is made. A destination of the transition to the federated authentication server 101 corresponds to the authentication request reception unit 105. In the present example embodiment, a case where the federated authentication server 101 provides a federated authentication function based on OpenID Connect will be described. In this case, the authentication request reception unit 105 corresponds to an authorization end point in the OpenID Connect specification. At this time, a client ID, a scope, a response type, and a redirect URI are added to a request parameter transmitted to the authorization end point in transition to the authorization end point according to the specification. However, the present example embodiment is not limited thereto, and any specification that can provide the destination of the transition to federated authentication from the resource server 104 may be employed.

Next, in step S303, the authentication screen processing unit 106 provides the authentication screen to the user terminal 103.

In step S304, the user inputs the authentication information via the authentication screen. The authentication information is typically an ID and a password but may be any information including biometric authentication information.

After the user inputs the authentication information, in step S305, the user terminal 103 transmits the authentication information to the federated authentication server 101. In step S306, the authentication information transmission unit 107 of the federated authentication server 101 transmits the authentication information to the authentication server 102.

In step S307, the authentication server 102 verifies the authentication information and performs authentication. In a case where the authentication information is not matched and the authentication is unsuccessful, the authentication server 102 returns an error response to the federated authentication server 101, and the federated authentication server 101 returns the error response to the user terminal 103. The user terminal 103 displays an authentication error message on the authentication screen. On the other hand, in step S307, in a case where the authentication server 102 successfully performs authentication, then in step S308, the authentication server 102 issues a token and returns an authentication success response together with the token to the federated authentication server 101. The token reception unit 108 of the federated authentication server 101 receives the issued token. In the present example embodiment, the issued token will be described as a pair of an ID token and a refresh token based on the OpenID Connect specification.

FIG. 4 illustrates an example of claims contained in the ID token. The "iss" claim represents the issuer of the token and corresponds to the authentication server 102. The "sub" claim represents a value that uniquely identifies the ID authenticated by the authentication server 102. The "aud" claim represents the ID of the client to which the ID token is issued and corresponds to the resource server 104. The "iat" claim represents the issue time of the ID token. The "exp" claim represents the expiration date of the ID token. The "auth_time" claim represents the time of the authentication by the authentication server 102. The "preferred_username" claim represents the username of the ID in the authentication information. The "email" claim represents the email address associated with the authentication information. The claims of the token described above are a mere example, and the present example embodiment is not limited thereto.

When the federated authentication server 101 receives the token and the authentication success response, then in step S309, the code issue unit 109 issues a code. The code may be any information for identifying the authentication success response, such as a universally unique identifier (UUID).

Next, in step S310, the storage unit 110 stores the code and the token in association with each other. FIG. 5 illustrates an example of a database in which the storage unit 110 stores the code and the token in association with each other. In FIG. 5, a code 501 corresponds to the code. An ID token 502 is the ID token issued by the authentication server 102. A refresh token 503 is issued together with the ID token by the authentication server 102. A client ID 504 is the client ID transmitted by the resource server 104 in the transition to the authorization end point of the federated authentication server 101 in step S302. A redirect URI 505 is the redirect URI transmitted by the resource server 104 in the transition to the authorization end point of the federated authentication server 101 in step S302. The redirect URI 505 is used in verification of the request parameter by a token end point (described below). A code expiration date 506 specifies the expiration date of the code, and a token request (described below) transmitted using a code having passed the expiration date is invalidated.

Data stored by the storage unit 110 according to the present example embodiment is not limited thereto, and the present example embodiment is applicable to any case where the code issued by the federated authentication server 101 and the token issued by the authentication server 102 are stored in association with each other.

A feature of the present example embodiment is that the token issued by the authentication server 102, which is different from the federated authentication server 101, is received in step S309 and then stored in association with the code in step S310 for use in the subsequent steps.

Next, in step S311, the code issue unit 109 transmits the issued code to the resource server 104. The code is an authorization code of the authorization end point according to the authorization code flow of OpenID Connect. This corresponds to a transition with the code added to the redirect URI transmitted to the authorization end point in response to the transition to the authorization end point of the federated authentication server 101 in step S302.

Next, in step S312, the resource server 104 transmits a token request to the federated authentication server 101. The token request reception unit 111 of the federated authentication server 101 receives the token request. This request corresponds to an ID token request made to the token end point using the authorization code issued by the authorization end point according to the authorization code flow of the OpenID Connect specification. Also in this case, the authentication information for the client ID and the redirect URI specified in the transition to the authorization end point are transmitted as the request parameter. The token request reception unit 111 verifies the request parameter of the token request. However, the present example embodiment is not limited to the OpenID Connect specification.

In a case where the token request reception unit 111 determines to return the token, then in step S313, the token transmission unit 112 acquires from the storage unit 110 the token corresponding to the code contained in the token request, and transmits the acquired token to the resource server 104.

In step S314, the resource server 104 verifies whether the token received from the federated authentication server 101 is the appropriate token issued by the authentication server 102. For example, in a case where the token is the ID token, since the token is in Json Web Token (JWT) format, a public key is acquired from the authentication server 102, and a signature of the token and appropriateness of the claims in FIG. 4 are verified.

In a case where the token is successfully verified, then in step S315, the resource server 104 manages the login state of the resource server 104 and provides the service to the user terminal 103.

With the above-described configuration and sequence, the federated authentication server 101 according to the present example embodiment transmits the authentication information from the authentication screen to the authentication server 102, and in a case where authentication is successful, the federated authentication server 101 receives a token and stores the received token in association with a code issued by the federated authentication server 101.

Thus, the federated authentication function such as OpenID Connect and the own authentication screen of the federated authentication server 101 are provided using the authentication function, the token issue function, and the function of providing the public key for token verification which are the functions of the authentication server 102.

In the first example embodiment, the token issued by the authentication server 102 in step S308 is stored in association with the code by the storage unit 110, and when the token request is received from the resource server 104, the token transmission unit 112 transmits the stored token in step S313. Thus, the issue time (the "iat" claim) of the ID token in FIG. 4 is technically not the time corresponding to the processing in step S313 but the time corresponding to the processing in step S308. In addition, the expiration date (the "exp" claim) of the ID token is determined based on the time corresponding to the processing in step S308. Accordingly, the difference in time between the processing in step S308 and the processing in S313 may affect the processing of the resource server 104 and the specification rigor.

Figure 6:
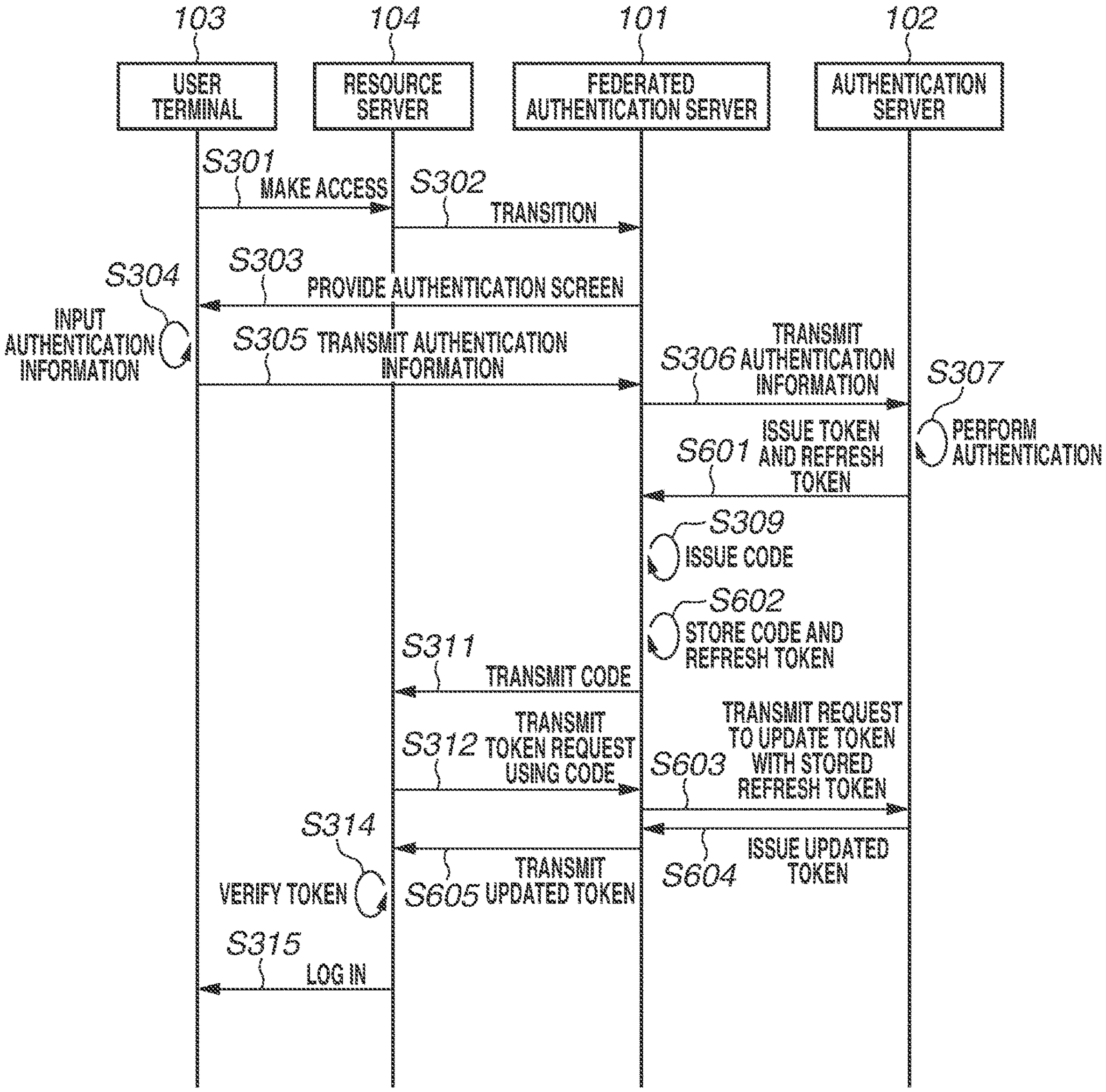
FIG. 6 is a diagram illustrating a sequence of a federated authentication server according to a second example embodiment.

FIG. 6 illustrates processing according to a second example embodiment as a solution to the above-described issue. While in the first example embodiment, the token is of any type and the refresh token may not necessarily be used, the refresh token is used in the present example embodiment.

Steps S301 to S307 in FIG. 6 are similar to those in FIG. 3 according to the first example embodiment. After the authentication by the authentication server 102 in step S307, in step S601, the authentication server 102 issues a token and a refresh token. In step S309, the code issue unit 109 of the federated authentication server 101 issues a code as in the first example embodiment.

Next, in step S602, the storage unit 110 stores the code and the refresh token in association with each other. At this time, the token issued by the authentication server 102 in step S601 may be stored or may be discarded without being stored in the present example embodiment. At least the refresh token is stored together with the code.

Steps S311 and S312 are similar to those in the first example embodiment. After the token request reception unit 111 receives the token request, the token update unit 113 acquires the refresh token associated with the code from the storage unit 110. Then in step S603, the token update unit 113 transmits the acquired refresh token and a token update request to the authentication server 102. In step S604, the authentication server 102 issues a token updated in response to the token update request. Then in step S605, the token transmission unit 112 transmits the updated token to the resource server 104. At this time, the refresh token used to update the token may also be provided together with the token to the resource server 104.

With the above-described sequence, the federated authentication server 101 according to the present example embodiment updates the token using the refresh token issued in step S601 at the time of receiving the token request in step S312. Thus, the issue time and the expiration date of the token that are contained in the token are set based on the time updated in step S604, so that the issue time and the expiration date are set more appropriately for the token to be returned from the federated authentication server 101.

A third example embodiment will be described. While in the first and second example embodiments, the description is given based on the authorization code flow of OpenID Connect and the token issued by the authentication server 102 is also described as the ID token, example embodiments of the present disclosure are not limited thereto. The token may be in a format different from that of the ID token, such as a simple UUID. In addition, the authentication request reception unit 105 as the authorization end point to which the transition is made in step S302 may not be based on the authorization end point of OpenID Connect. Furthermore, the end point received by the token request reception unit 111 in step S312 may not be based on the token end point of OpenID Connect. The token issued by the authentication server 102 may be stored in association with the code issued by the federated authentication server 101, and the token associated with the code may be returned in response to the token request using the code from the resource server 104.

A fourth example embodiment will be described. While three types of servers, i.e., the federated authentication server 101, the authentication server 102, and the resource server 104 are described in the first to third example embodiments, the federated authentication server 101, the authentication server 102, and the resource server 104 may not be configured as separate apparatuses. For example, the federated authentication server 101 and the resource server 104 may be configured as a single apparatus, and the processing in steps S302, S311, S312, and S313 may be performed by communication between functions operating in the same apparatus.

In a case where the functions of the federated authentication server 101 and the authentication server 102 are configured as a single apparatus, the storage unit 110 can be eliminated if the issue of the token, which is originally performed in step S308 following the authentication in step S307, is performed following step S312. In this case, a configuration in which software of the federated authentication server 101 and software of the authentication server 102 are run in the same apparatus may be desirably used.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-013917, filed Jan. 29, 2021, which is hereby incorporated by reference herein in its entirety.

What is claimed is:

1. A federated authentication server configured to provide, in cooperation with an authentication server, a function of authenticating a user terminal to a resource server configured to provide a service to the user terminal, the federated authentication server comprising:

one or more processors; and one or more memories including instructions that, when executed by the one or more processors, causes the federated authentication server to:

transmit authentication information about a user of the user terminal to the authentication server;

receive, from the authentication server, a token which is used for accessing the resource server from the user terminal;

issue a code which is used for identifying an authentication success response after the token is received from the authentication server, wherein the code is generated by the federated authentication server;

store the code and the token in association with each other before a token request including the code is transmitted from the resource server; and transmit the token associated with the code to the resource server in a case where the token request is transmitted from the resource server, wherein the token request indicates that the resource server requests the federated authentication server to transmit the token associated with the code.

2. The federated authentication server according to claim 1, wherein the one or more memories further causes the federated authentication server to:

provide the user terminal with an authentication screen via which the authentication information is input to the user terminal.

3. The federated authentication server according to claim 2, wherein the one or more memories further causes the federated authentication server to:

receive an authentication request from the resource server, provide the authentication screen based on the receiving of the authentication request, and transmit the code to the resource server as a response to the receiving of the authentication request.

4. The federated authentication server according to claim 1, wherein the federated authentication server transmits the code and the token on a basis of OpenID Connect.

5. The federated authentication server according to claim 1, wherein the token includes an identification (ID) token or a refresh token.

6. The federated authentication server according to claim 1, wherein the one or more memories further causes the federated authentication server to transmit a request for updating the token associated with the code to the authentication server and receive an updated token from the authentication server, and transmit the updated token to the resource server.

7. A federated authentication method for providing, in cooperation with an authentication server, a function of authenticating a user terminal to a resource server configured to provide a service to the user terminal, the federated authentication method comprising:

transmitting authentication information about a user of the user terminal to the authentication server;

receiving, from the authentication server, a token which is used for accessing the resource server from the user terminal;

issuing a code which is used for identifying an authentication success response after the token is received from the authentication server, wherein the code is generated by the federated authentication server;

storing the code and the token in association with each other before a token request including the code is transmitted from the resource server; and transmitting the token associated with the code to the resource server in a case where the token request is transmitted from the resource server, wherein the token request indicates that the resource server requests the federated authentication server to transmit the token associated with the code.

8. A non-transitory computer-readable storage medium storing a program for causing a federated authentication server to execute a federated authentication method for providing, in cooperation with an authentication server, a function of authenticating a user terminal to a resource server configured to provide a service to the user terminal, the federated authentication method comprising:

transmitting authentication information about a user of the user terminal to the authentication server;

receiving, from the authentication server, a token which is used for accessing the resource server from the user terminal;

issuing a code which is used for identifying an authentication success response after the token is received from the authentication server, wherein the code is generated by the federated authentication server;

storing the code and the token in association with each other before a token request including the code is transmitted from the resource server; and transmitting the token associated with the code to the resource server in a case where the token request is transmitted from the resource server, wherein the token request indicates that the resource server requests the federated authentication server to transmit the token associated with the code.

9. A federated authentication system comprising:

an authentication server; and a federated authentication server configured to provide, in cooperation with the authentication server, a function of authenticating a user terminal to a resource server configured to provide a service to the user terminal, wherein the federated authentication server includes:

one or more processors; and one or more memories including instructions that, when executed by the one or more processors, causes the federated authentication server to:

transmit authentication information about a user of the user terminal to the authentication server;

receive, from the authentication server, a token which is used for accessing the resource server from the user terminal;

issue a code which is used for identifying an authentication success response after the token is received from the authentication server, wherein the code is generated by the federated authentication server;

store the code and the token in association with each other before a token request including the code is transmitted from the resource server; and transmit the token associated with the code to the resource server in a case where the token request is transmitted from the resource server, wherein the token request indicates that the resource server requests the federated authentication server to transmit the token associated with the code.

* * * * *